United States Patent [19]

Brueckner

[11] Patent Number: 4,494,839
[45] Date of Patent: Jan. 22, 1985

[54] AUTOMATIC FOCUSING DEVICE FOR SLIDE PROJECTORS

[75] Inventor: Dietrich Brueckner, Wetzlar-Neuborn, Fed. Rep. of Germany

[73] Assignee: Ernst Leitz Wetzlar GmbH, Wetzlar, Fed. Rep. of Germany

[21] Appl. No.: 469,312

[22] Filed: Feb. 24, 1983

[30] Foreign Application Priority Data

Feb. 27, 1982 [DE] Fed. Rep. of Germany ....... 3207152

[51] Int. Cl.³ .............................................. G03B 3/10
[52] U.S. Cl. .................................................. 353/101
[58] Field of Search ....................... 353/101; 352/140; 355/44, 55, 56, 57; 350/41, 46, 76, 77; 354/404

[56] References Cited

U.S. PATENT DOCUMENTS 3,628,863 12/1971 Kottler ................................. 353/101
3,861,794 1/1975 Sobotta ................................ 353/101

FOREIGN PATENT DOCUMENTS 2021270 11/1971 Fed. Rep. of Germany ...... 353/101
2503776 8/1976 Fed. Rep. of Germany ...... 353/101

*Primary Examiner*—Harry N. Haroian
*Attorney, Agent, or Firm*—Schwartz, Jeffery, Schwaab, Mack, Blumenthal & Koch

[57] ABSTRACT

An automatic focusing device for slide projectors in which at least one photo-electric receiver of the secondary projection device which determines the position of the slide generates, from a beam of light impinging upon the receiver, the error voltage controlling the focusing of the slide. The error voltage is fed into an electronic amplifier circuit of the focusing device, which contains manual facilities for refocusing the slide comprising primary switching elements which automatically apply the error voltage produced by the photoelectric receiver to the positioning motor for the focusing device, but only when this error voltage reaches a predetermined level. In addition, the device contains secondary switching elements which cut off the amplifier circuit from the positioning motor when the manual facilities for focus adjustment are operated, and which connect the focus adjustment means to the positioning motor and adjust the positioning motor to run at a constant speed via a combination (group) of resistors.

5 Claims, 2 Drawing Figures

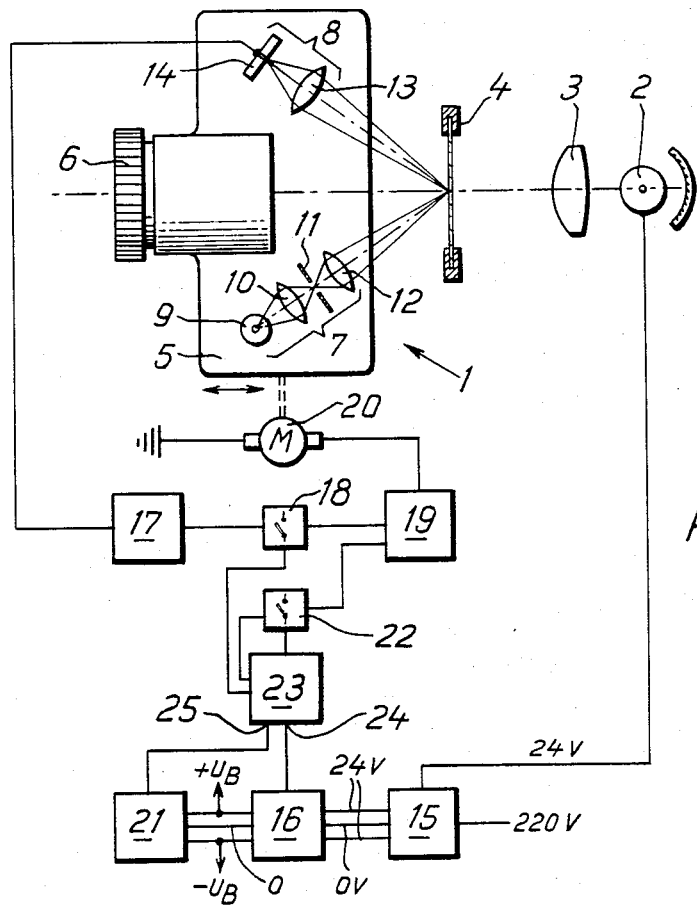
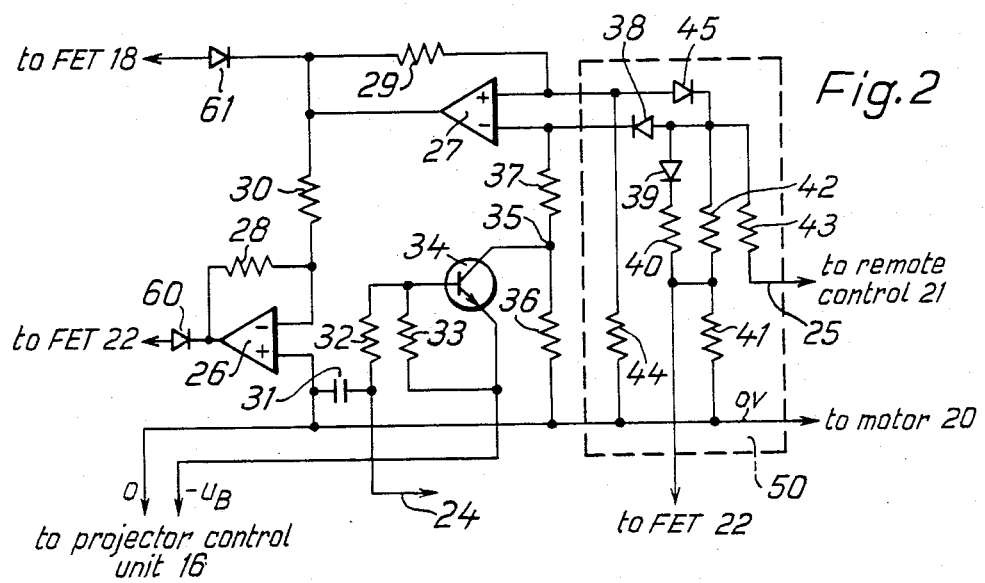
Fig.1
Fig.2

AUTOMATIC FOCUSING DEVICE FOR SLIDE PROJECTORS

BACKGROUND OF THE INVENTION

The invention concerns an automatic focusing device for slide projectors in which at least one photo-electric receiver of the secondary projection device which determines the position of the slide generates, from a beam of light impinging upon the receiver, the error voltage controlling the focusing of the slide. The error voltage is fed into an electronic amplifier circuit of the focusing device, which contains manual facilities for focus adjustment of the slide.

A device of this type is intended to allow readjustment of the image sharpness for the projected slide which, due to its condition (glass enclosure, extreme "popping") can no longer be focused adequately by the automatic focusing device, or whose projected image is out of focus when subjectively assessed.

Auto focus slide projectors of the prior art, for example, disclosed in DE-AS 1,472,300 or DE-PS 1,911,957, employ infrared control rays, the reflection of which is utilized at the slide emulsion carrier for control purposes. Here, the slide or the control arrangement are readjusted in such a way that the reflected radiation passing a slit diaphragm enters adjacently between two photo-electric receivers. This boundary position corresponds to the mechanically predetermined zero position of the control arrangement. For projection equipment of this type which is not permanently installed, the boundary position requires that when the first slide is introduced, the projection lens be set as precisely as possible to maximum sharpness; the use of a test slide to accomplish this is preferable.

With such an arrangement it is, of course, possible to adjust the sharpness using remote control, whereby the aperture or the projection lens is readjusted with a separate drive. However, the extra motor required for this function means considerable expenditure.

In DE-GM 1,979,885, there is disclosed a slide projector having an automatic focusing device and an additional focusing device operating manually via remote control, both served by the same positioner for sharpness adjustment. The two focusing devices are equipped with positioner control elements operating independently from one another. Simultaneous operation of these control elements is prevented by means of a changeover switch.

In order to effect a correction of the basic or initial sharpness position, the auto focus device described in DE-OS 2,333,128 contains facilities which add an adjustable voltage to the error voltage determined by the photo-electric receiver and thus cause the auto focus device to be disabled in a position allowing readjustment.

It is a disadvantage of the device described in the two publications mentioned immediately above that the readjusted position is maintained. As a consequence, only slides of identical structure can be used thereafter. Renewed refocusing is required each time slides of differing structure are to be used.

SUMMARY OF THE INVENTION

Therefore, it is an object of the present invention to provide an improved automatic focusing device for a slide projector.

It is a particular object of the invention to provide an automatic focusing device which allows for readjustment of the sharpness position determined during auto focus operation, and which affords cancellation of the readjusted position and automatic return to auto focus operation as the slides advance.

Still another object of the invention resides in providing an improved slide projector embodying the automatic focusing device according to the invention.

In accomplishing the foregoing objects, there has been provided in accordance with the present invention an automatic focusing device for a slide projector, comprising secondary projection means for producing an error voltage signal determinative of the deviation of a slide from the position of sharpest focus; automatic focusing means including a positioning motor, for adjusting the focus of the slide in response to the error voltage signal; and means for manually adjusting the focus of the slide, wherein the automatic focusing means includes an electronic amplifier circuit comprising primary switching means for applying the error voltage signal to the positioning motor when the error voltage signal exceeds a predetermined level, and secondary switching means for cutting-off the signal from the first switching means to the positioning motor in response to actuation of the manual focus adjusting means and for connecting the manual focus adjusting means to the positioning motor. Preferably, the amplifier circuit also includes means for adjusting the positioning motor to a constant speed.

Further objects, features and advantages of the present invention will become apparent from the detailed description of preferred embodiments which follows, when considered together with the attached figures of drawings.

BRIEF DESCRIPTION OF THE DRAWINGS

In the drawings:

FIG. 1 is a block diagram schematically illustrating the focusing device in accordance with the invention; and FIG. 2 is a circuit diagram of a switching amplifier required for switching the auto focus to manual mode.

DETAILED DESCRIPTION OF PREFERRED EMBODIMENTS

In connection with an automatic focusing device of the type mentioned in the introductory paragraphs, the invention employs an amplifier circuit which:

(a) contains primary switching elements which automatically apply the error voltage produced by the photo-electric receiver to the positioning motor for the focusing device, but only when this error voltage reaches a predetermined level, and (b) includes secondary switching elements which cut off the auto focus amplifier circuit from the positioning motor when the manual facilities for focus adjustment are operated, and which connect the facilities effecting focus adjustment to the positioning motor.

Shown schematically in FIG. 1 are the essential elements of a slide projector, including a light source 2, a condenser lens 3, a slide 4 as well as a base plate 5 including projection lens 6, auto focus projection group 7 and auto focus detector 8.

The auto focus projection group 7 contains a lamp 9, a focusing lens 10, a slit diaphragm 11 and an objective lens 12. The auto focus detector 8 comprises a receiver lens 13 and a twin photo receiver 14.

The slide projector contains a transformer 15 which steps down the respective line voltage (110 volts or 220 volts) supplied to the projector to a low voltage. The latter is applied on the one hand to the auto focus device via a projector control unit 16 and on the other hand to the light source 2 of the slide projector.

The auto focus device contains an input stage 17 including an auto focus amplifier having a predetermined level of amplification. The output currents of the silicon diodes for the twin photo receiver 14 are fed to input stage 17, the difference of these two levels is determined and, following amplification, the difference is fed to a first field effect transistor 18 as an input signal. This always occurs when a slide is in the projection beam path and the reflection surface at slide 4 deviated from the "in focus"position. When the switching amplifier 23 is in one of its positions, the field effect transistor 18 becomes conductive. This applies the input signal to a motor amplifier 19 which feeds a positioning motor 20 associated with the base plate 5 of the slide projector. Depending on the polarity of this voltage, the positioning motor 20 moves the base plate 5 in one direction or another indicated by the double arrow. This movement continues until the slide 4 is in focus, i.e., until the beam of light emitted by the auto focus projection group 7 and reflected by the slide 4 impinges upon the center of the twin photo receiver 14.

Automatic focusing of a slide can be changed, for example, in accordance with a subjective assessment of the image sharpness, by manual focusing. In order to achieve this, however, the circuitry providing automatic focusing must be disabled. This cut-off is effected via a remote control unit 21 by operating switches contained in this unit but not shown here. The electrical signal triggered by these switches is fed to a second field effect transistor 22 which forms a switching amplifier having an output which, like the one of field effect transistor 18, is connected to the input of the motor amplifier 19. This electrical signal makes the field effect transistor 22 conductive. At the same time, the field effect transistor 18 is inhibited so that only the focusing signal output by the remote control unit 21 is fed to the motor amplifier 19 and thus to the motor 20.

A switching amplifier 23 having design features as described in the following is connected ahead of the field effect transistors 18 and 22 to ensure their reliable switching performance.

A first input 24 of this switching amplifier 23 is connected with the control unit 16 of the slide projector, and a second input is connected with the remote control unit 21. The latter is connected with control unit 16 and is, of course, equipped with all conventional slide projector controls not depicted here.

As shown in FIG. 2, the switching amplifier 23 comprises the circuit amplifiers 26, 27 with resistors 28 and 29, respectively, arranged in the feedback branches. The inverted input of the circuit amplifier 26 is connected to the output of the circuit amplifier 27 via a resistor 30. To the other input of the circuit amplifier 26 and to capacitor 31 is applied half of the operating voltage. This capacitor is charged via resistors 32, 33 which form a voltage divider. The divider point of this voltage divider (resistors 32, 33) is connected with the base of a transistor 34, and the emitter of this transistor is connected to the other end of the resistor 33. The collector of the transistor 34 is connected to the divider point 35 of a voltage divider formed by resistors 36, 37.

In addition, one end of the voltage divider (resistors 36, 37) is connected to the inverted input of circuit amplifier 27.

A network 50 made up of blocking diodes and resistors is connected to the inputs of circuit amplifier 27; a functional description of this network is given below.

The operation of the circuit described is as follows: To ensure proper switching performance of the FETs 18 and 22, their bases are driven by circuit amplifiers 27 and 26. Faulty control of FET 18 by excessive drain voltage is prevented by limiting the drain voltage in a known way, e.g., by using two zener diodes in an inverse-parallel connection.

The drain voltage of FET 22 represents the control voltage for manually focusing the slide. This voltage is generated through resistors 41, 42 and 43 of a voltage divider circuit. The path thereof runs from resistor 43 via resistors 42 and 41 to FET 22.

Reversal of the circuit amplifier 27 is effected by the combination of resistor 43, blocking diode 45, resistor 44 or alternatively by the combination of resistor 43, blocking diode 38 and resistors 37 and 36, depending on the polarity of the incoming signal.

In parallel with resistor 36 there is the automatic drive for the "auto focus" circuit. It consists of transistor 34 which is connected to the "−" operating voltage and "0" (center of operating voltage). As shown in FIG. 2 these voltages are supplied by the projector control unit 16 to transistor 34 which becomes momentarily conductive through capacitor 31 when the operating voltage is applied. This causes circuit amplifier 27 to move to a switching position so that FET 18 becomes conductive, which then allows the "auto focus" to operation.

When the projector is switched on, capacitor 31 charges via the two resistors 32, 33 between the center point voltage "0" and the operating voltage $-U_B$. Since the emitter of transistor 34 is at $-U_B$, transistor 34 remains open until capacitor 31 is completely charged. $-U_B$ is thus also connected to the inverted input of circuit amplifier 27, with a positive voltage then existing across its output.

Circuit amplifier 27 remains safely in this switching position by feeding back the output to the non-inverted input via resistor 29.

Circuit amplifier 26 follows the action of circuit amplifier 27 and inverts its output signal. Consequently, a negative voltage is present across its output. FET 22 is inhibited via a protective diode 60 connected to the circuit after the output of circuit amplifier 26. A positive voltage exists across another blocking diode 61 connected behind FET 18. With FET 18 in the conductive stage, the "auto focus" signal then arrives at motor amplifier 19 from where it is passed to motor 20.

Once the manual focus button (not shown here) on remote control unit 21 is pushed into one or another direction for moving motor 20 to achieve proper focus, a positive or negative manual control voltage is applied to resistors 41, 42, 43. This group of resistors causes the voltage to be divided in such a way that the voltage across resistor 41, in conjunction with the amplification factor of motor amplifier 19, reaches a level which allows a suitable adjustment speed of base plate 5 and thus of projection lens 6. This means that the user can confidently watch the image attaining the optimal sharpness required by him.

However, the voltage existing across resistors 41, 42, 43 is at the same time applied to the inputs of circuit amplifier 27 via blocking diode 38 or 45, depending on the polarity of the voltage. Blocking diode 45 is conductive with respect to the negative voltage. The voltage flowing via the non-inverted input of circuit amplifier 27 does not change its polarity, so that a negative voltage also exists across its output. FET 18 is inhibited by this voltage via the blocking diode not shown here.

The negative voltage existing across the output of circuit amplifier 27 is also fed to the inverted input of circuit amplifier 26. FET 22 is rendered conductive by the positive voltage generated by inversion at the output of circuit amplifier 26. The negative voltage existing across the output of circuit amplifier 27 also causes the voltage drop at resistor 41 of network 50 to become effective when the switch for manual focus adjustment is operated.

When blocking diode 45 is non-conductive, the desired voltage drop across resistor 41 is achieved due to the fact that a negative component voltage exists across resistor 44. It is derived from the negative voltage existing across the output of circuit amplifier 27 via resistors 29 and 44, which also determine the voltage amplification for circuit amplifier 27.

When a negative manual control voltage is applied via resistor 43 to the blocking diode 45 the latter terminates the blocking. The voltage drop across resistor 44 is then added to the voltage of resistors 42 and 41 by a voltage dividing circuit formed by resistors 29 and 44. This would result in an undesirable higher motor voltage for one rotational direction. To avoid, this blocking diode 39 in series with resistor 40 is connected in parallel with respect to resistor 42.

When negative control voltage is present, the voltage divider made up of resistors 41, 42 will have a lower total resistance as a result of parallel connection of blocking diode 39 and resistor 40 with respect to resistor 42. Due to the higher current, a higher voltage drop across resistors 40, 42, which are connected in parallel, is then achieved, resulting in the control voltage across resistor 41 remaining constant.

To avoid adverse effects upon the projector movement (change of slides), a blocking diode not shown here, is inserted into the signal line of the projector control unit 16. This diode blocks the momentary positive voltage to transistor 34 at the instant the slide projector starts operating.

What is claimed is:

1. An automatic focusing device for a slide projector, comprising:
   control unit means for producing a cancellation signal;
   means for producing an error voltage signal determinative of deviation of a slide from a position of sharpest focus;
   manual control means for producing a manual control signal;
   means, responsive to said manual control signal, for generating a manual focus signal from said manual control signal;
   a positioning motor;
   means, responsive to said error voltage signal or to said manual control signal, for driving said positioning motor;
   primary switch means, electrically interposed between said error voltage signal producing means and said driving means, and switchable between a first state in which said error voltage signal producing means is connected to said driving means, and a second state, in which said error voltage signal producing means is not electrically connected to said driving means;
   secondary switch means, electrically interposed between said manual focus signal generating means and said driving means, and switchable between a first state in which said manual focus signal generating means is not electrically connected to said driving means, and a second state in which said manual focus signal generating means is not electrically connected to said driving means; and
   switching amplifier means, responsive to said manual control signal and said cancellation signal, and connected to said primary switch means and said secondary switch means, for switching each of said primary and secondary switch means into the respective second state of each in response to the presence of said manual control signal, and for switching each of said primary and secondary switch means into their respective first states in response to the presence of said cancellation signal.

2. An automatic focusing device in accordance with claim 1, wherein the means for generating manual focus signals further comprises means including a plurality of resistors for adjusting the positioning motor to a constant speed.

3. An automatic focusing device in accordance with claim 1, wherein said primary and secondary switch means each comprise a field effect transistor.

4. An automatic focusing device in accordance with claim 2, wherein said adjusting means comprises a voltage-dividing means which is polarity-dependent.

5. An automatic focusing device in accordance with claim 1, wherein said error voltage signal producing means includes a photo-electric receiver for generating said error voltage signal.

* * * * *